(12) United States Patent
Nishimura et al.

(10) Patent No.: US 7,848,008 B2
(45) Date of Patent: Dec. 7, 2010

(54) STRUCTURAL COLOR DISPLAY

(75) Inventors: Motoi Nishimura, Tokyo (JP); Mitsutoshi Nakamura, Tokyo (JP); Tatsuya Nagase, Tokyo (JP); Aya Shirai, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 45 days.

(21) Appl. No.: 12/326,386

(22) Filed: Dec. 2, 2008

(65) Prior Publication Data

US 2009/0147339 A1 Jun. 11, 2009

(30) Foreign Application Priority Data

Dec. 10, 2007 (JP) ............... 2007-318087

(51) Int. Cl.
*G02B 26/00* (2006.01)
(52) U.S. Cl. ..................................... 359/296
(58) Field of Classification Search ................ 359/291, 359/296; 345/55, 84–85, 107–109
See application file for complete search history.

(56) References Cited

U.S. PATENT DOCUMENTS

| | | | |
|---|---|---|---|
| 5,999,282 A | 12/1999 | Suzuki | |
| 7,015,893 B2 * | 3/2006 | Li et al. | 345/107 |
| 7,130,102 B2 * | 10/2006 | Rabinowitz | 359/290 |
| 7,262,901 B2 * | 8/2007 | Kanbe | 359/296 |
| 7,542,635 B2 * | 6/2009 | Coleman | 385/31 |
| 2003/0201696 A1 * | 10/2003 | Muramatsu et al. | 310/334 |
| 2004/0070824 A1 | 4/2004 | Toda | |
| 2004/0080821 A1 | 4/2004 | Yamaguchi | |
| 2005/0142429 A1 | 6/2005 | Suzuki | |
| 2006/0181769 A1 | 8/2006 | Kumasawa | |
| 2006/0215958 A1 * | 9/2006 | Yeo et al. | 385/31 |
| 2006/0285195 A1 * | 12/2006 | Moriyama et al. | 359/296 |

FOREIGN PATENT DOCUMENTS

| | | |
|---|---|---|
| EP | 0561551 | 9/1993 |
| WO | 03050612 | 6/2003 |

* cited by examiner

*Primary Examiner*—Ricky L Mack
*Assistant Examiner*—Vipin M Patel
(74) *Attorney, Agent, or Firm*—Lucas & Mercanti, LLP

(57) ABSTRACT

Disclosed is a structural color display including: (a) a pattern forming member which forms a plurality of cells each lined up in two dimension; and (b) a light transmissive image display sheet comprising a color showing layer which shows a structural color, the light transmissive image display sheet being faced to the pattern forming member, wherein each cell is independently controlled to reflect a light from a light source corresponding to an image pattern to be displayed, provided that the reflected light is made to enter in the image display sheet from a side facing the pattern forming member by a predetermined incident angle corresponding to the cell. The pattern image forming member comprises the element having a plurality of microscopic mirrors arranged in a rectangular array and being individually rotated.

13 Claims, 3 Drawing Sheets

STRUCTURAL COLOR DISPLAY

CROSS-REFERENCE TO RELATED APPLICATION

This application is based on Japanese Patent Application No. 2007-318087 filed on Dec. 10, 2007 with Japan Patent Office, the entire content of which is hereby incorporated by reference.

BACKGROUND OF THE INVENTION

1. Technical Field

The present invention relates to a structural color display utilizing color showing of a structural color.

2. Description of Related Art

Heretofore, a display which provides sufficient brightness at low electrical power consumption, and displays various colors has been demanded. Furthermore, a display which provides high visual security has been desired.

However, a general liquid crystal display has problems such that large power consumption is required, and the image surface of the electronic paper tends to darken since a color filter is generally employed, for example, to vary colors, and further, the image surface thereof becomes darker when filters such as a polarizing filter is employed to improve visual security.

The Patent Document 1 discloses a projection screen which shows a structural color based on a light reflection as an instrument by which an image can be visually recognized, but the screen is not a display. Therefore, a display by which an image can be visually recognized exhibiting sufficient brightness at low electrical power consumption has not been realized.

Patent Document 1: International Publication Pamphlet 2003/50612

SUMMARY

The present invention is achieved in consideration of the above problems, and it is an object of the present invention to provide a structural color display which exhibits sufficient brightness at low electrical power consumption, and displays various colors.

The structural color display of the present invention displays an image based on the structural color, and is characterized in that the light transmissive image display sheet featuring a color showing layer which shows the structural color is overlaid on the pattern image forming member which is constituted such that a plurality of cells are arranged side by side across the surface, and each cell of the pattern forming member is independently controlled to reflect a light from a light source corresponding to an image pattern to be displayed, provided that the reflected light is made to enter in the image display sheet from a side facing the pattern forming member by a predetermined incident angle corresponding to the cell.

In the structural color display of the present invention, the above-mentioned pattern image forming member can be the cell having a microscopic mirror which is arranged in a rectangular array and is individually rotated.

According to the structural color display of the present invention, since the structural color, which differs from colors generated by typical dye absorption, exhibits low energy loss, as well as exhibiting high brightness, the structural color display provides sufficient brightness at low electrical power consumption, and further, displays various colors with only one kind of image display sheet by, for example, creating a pattern image forming member exhibiting a gradated display. Further, the structural color display exhibits high visual security on a displayed image, since the structural color depends an viewing angle.

DESCRIPTION OF ALPHANUMERIC DESIGNATIONS

Figure 1:
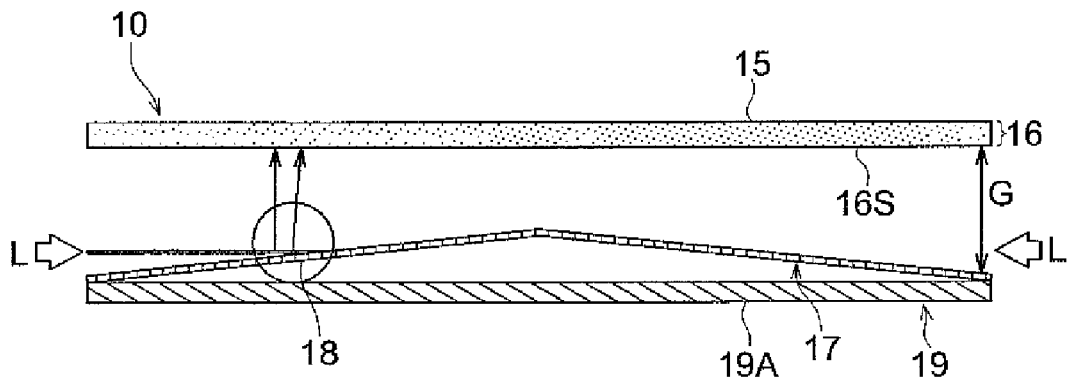
FIG. 1: An explanatory cross-sectional view illustrating an example of a constitution of the structural color display of the present invention.

10: structural color display
12: particle for color showing layer
13: particle layer
15: color showing layer
16: image display sheet
16A: area corresponding to a cell
17: pattern image forming member
18: cell
19: element board
19A: substrate
D: distance between layers
G: maximum gap
L: white light
$L_\alpha$: direction of light emission
M: matrix
$\alpha, \alpha_1, \alpha_2$: incident angle
$\beta_1, \beta_2$: inclination angle
$\theta$: viewing angle

DESCRIPTION OF THE PREFERRED EMBODIMENTS

The present invention is explained in detail below.

Figure 2:
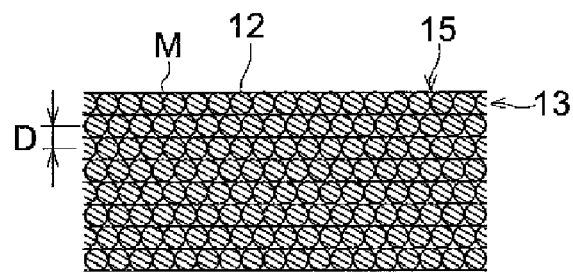
FIG. 2: An explanatory cross-sectional view illustrating an example of a constitution of a color showing layer constituting the structural color display of the present invention.
Figure 3:
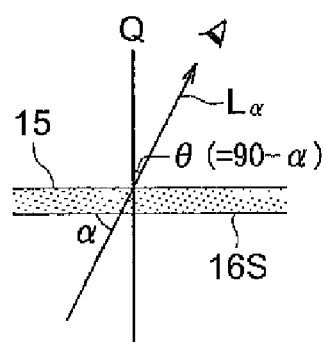
FIG. 3: An explanatory figure of a visually recognized color in the surface of the image display sheet of the structural color of the present invention.

FIG. 1 is an explanatory cross-sectional view illustrating an example of a constitution of the structural color display of the present invention. FIG. 2 is an explanatory cross-sectional view illustrating an example of a constitution of a color showing layer constituting the structural color display of the present invention.

The structural color display 10 of the present invention is constituted such that, as shown in FIG. 1, the light transmissive image display sheet 16, having the color showing layer 15 which shows the structural color, is overlaid on the pattern image forming member 17, which is constituted such that the cells 18 are arranged side by side across the surface, and a pattern image is formed in such a manner that each cell 18 irradiates, for example, white light L generated from a light source (not illustrated), into the image display sheet 16, corresponding to image patterns to be displayed, at an incident angle which is set corresponding to the aforesaid cell 18, from the laminated layer surface 16S facing toward the aforesaid pattern image forming member 17, and as a result, the above pattern image is visually recognized on the surface of the image display forming sheet 16 as an image based on the structural color.

[Color Showing Layer]

The color showing layer 15 of the image display sheet 16 constituting the structural color display 10 is a layer which shows the structural color, and which color showing layer 15 is specifically constituted such that, as shown in FIG. 2, in a matrix M such as, for example the atmosphere, a plurality of the particle layers 13 composed of the particles 12 for color showing layer exhibiting a refractive index differing from a refractive index of the above matrix M, are regularly arranged through the thickness to form a repeating structure. Based on the formation of such a repeating structure in the color showing layer 15, chromatic colors can be visually recognized via irradiation of visible range light.

Specifically, as shown in FIG. 2, the color showing layer 15 may exhibit a constitution such that a plurality of the particle layer 13, which is formed by the particles 12 for color showing layer contacting each other, are regularly arranged in a state of contact through the thickness in the matrix M.

In such a color showing layer 15, the particles 12 for color showing layer are closely packed so as to form a cubic close-packed structure such as a face-centered cubic structure or a hexagonal close-packed structure to form the color showing layer 15.

The difference of the refractive index between the particle 12 for color showing layer and the matrix M can be suitably set depending on properties of the targeted structural color display or kinds of the pattern image forming member. The above difference can be set, for example, to 0.1 to 0.7, and more preferably 0.2 to 0.5.

The refractive index of particles can be determined by various commonly known methods, but the refractive index of the particles 12 for color showing layer of the present invention is a value measured by a water immersion method.

Specific refractive indices of particles include, for example, 1.59 for polystyrene, 1.49 for methyl polymethacrylate, 1.60 for polyester, 1.40 for fluorine modified methyl polymethacrylate, 1.56 for polystyrene/butadiene copolymer, 1.48 for methyl polyacrylate, 1.47 for butyl polyacrylate, 1.45 for silica, 2.52 for titanium oxide (anatase type), 2.76 for titanium oxide (a rutile type), 2.71 for copper oxide, 1.76 for aluminum oxide, 1.64 for barium sulfate, and 3.08 for ferric oxide.

[Structural Color]

The structural color is not a color generated by a light absorption by dyes and the like, but a reflection color of selected light generated by a periodic structure and the like. The structural color can be generated by, for example, thin film interference, light scattering (such as Rayleigh scattering and the Mie scattering), multilayer interference, a diffraction grating, and a photonic crystal.

The structural color is a color represented by Formula (1) below based on Bragg's Law.

$$\lambda = 2nD(\cos\theta) \qquad \text{Formula (1)}$$

In Formula (1), $\lambda$ represents a peak wavelength of the structural color, n represents a refractive index of the color image showing layer 15 represented by Formula (2) below, D represents a distance between the particle layers 13, and $\theta$ represents a viewing angle to a perpendicular line on the image display sheet 16.

$$n = \{na \cdot C\} + \{nb \cdot (1-c)\} \qquad \text{Formula (2)}$$

In Formula (2), na represents a refractive index of the Particle 12 for color showing layer, nb represents a refractive index of the matrix M, and c represents a volume fraction of the particle 12 for color showing layer in the color showing layer 15.

It is preferable that the particle 12 for color showing layer, which forms the color showing layer 15, exhibits a spherical shape. The "exhibiting a spherical shape" means that SEM photographs of randomly selected 100 particles for color showing layer are taken at a magnification of 10,000 times employing a scan electron microscope (SEM), which photographs are then analyzed via an image processing analyzer (manufactured by Nireco Corp.), and an average SF-1 value derived from Numerical Formula (1) below is from 100 to 110.

$$SF\text{-}1 \text{ value} = (\text{the maximum length of a particle})^2/(\text{a projected area of a particle}) \times (\pi/4) \times 100 \qquad \text{Numerical Formula (1)}$$

In above Numerical Formula (1), the "maximum length of a particle" refers to the maximum width of a projected image of the particle on a plane, which maximum width is the maximum distance of distances of parallel two lines which sandwich the projected image, and the "a projected area of a particle" refers to an area of a projected image on a plane of the particle for color showing layer.

The average particle diameter of the particle 12 for color showing layer can be, for example, from 100 to 300 nm, and preferably from 150 to 250 nm.

Since the structural color of the obtainable structural color display 10, which is visually recognized at a certain viewing angle, is determined by the average particle diameter of the particle 12 for color showing layer, the aforesaid particle diameter may be suitably set so that a color required for the structural color which is visually recognized at a certain viewing angle is developed.

Further, when the color showing layer 15 is formed, the particle 12 for color showing layer preferably exhibits high monodispersity to readily achieve a regular arrangement of the particle 12 for color showing layer, and the CV value indicating a particle distribution is preferably 20% or less, more preferably 10% or less, and particularly preferably 5% or less.

When the CV value is less than 20%, the color showing layer composed of an regularly arrangement of the particle 12 for color showing layer can be formed in matrix M, and as a result, the color showing layer, which shows the structural color, can be provided.

The term "average particle diameter" refers to a number-based average diameter, and the term "CV value" refers to a number-based particle distribution. Specifically, the average particle diameter and the CV value are determined by the method below.

The average particle diameter is obtained in a manner that photographs of 200 particles are taken at a magnification of 50,000 times employing a scan electron microscope "JSM-7410" (manufactured by JEOL Ltd.), and the maximum length of each of spherical particles on the photographs is measured, and then the number-based average value is calculated. The term "the maximum length" refers to the maximum length of lengths between any two points on circumference of each spherical particle.

The CV value is calculated by Formula (CV) below employing the standard deviation of the number-based particle distribution and the above average particle diameter.

$$CV \text{ value (\%)} = ((\text{standard deviation})/(\text{average particle diameter})) \times 100 \quad \text{Formula (CV)}$$

The thickness of the Color showing layer 15 is preferably, for example, from 3 to 30 µm.

When the thickness of the color showing layer is less than 3 µm, color showing of the aforesaid color showing layer is degraded, and then the brightness of the image surface of the obtainable structural color display may be insufficient, and when the thickness of the color showing layer is more than 30 µm, the obtainable image display sheet becomes cloudy to cause light scattering, and as a result, color showing of the image display sheet is degraded, and then the brightness of the image surface of the obtainable structural color display way be insufficient.

In the color showing layer 15, the repeating number of the particle layer 13 is preferably 8 or more, and more preferably from 8 to 50.

In a case where the repeating number is less than 8, the color showing layer is not allowed to show the structural color.

[Particle for Color Showing Layer]

The particle 12 for color showing layer, which forms the color showing layer 15, includes various compositions.

Specific examples of the organic particle include polymerized particles comprising a polymerizable monomer, and copolymerized particles comprising two or more kinds of polymerizable monomers, which monomer includes a styrene monomer such as styrene, methyl styrene, methoxy styrene, butyl styrene, phenyl styrene, and chlorostyrene; an acrylic acid ester monomer or a methacrylic acid ester monomer such as methyl acrylate, ethyl acrylate, (iso)propyl acrylate, butyl acrylate, hexyl acrylate, octyl acrylate, ethylhexyl acrylate, methyl methacrylate, ethyl methacrylate, butyl methacrylate, and ethylhexyl methacrylate; a carboxylic acid monomer such as acrylic acid, methacrylic acid, itaconic acid, and fumaric acid.

Further, the above particle may include a polymerized particle comprising a polymerizable monomer in which a crosslinkable monomer is added. The crosslinkable monomers include divinylbenzene, ethylene glycol dimethacrylate, tetraethylene glycol dimethacrylate, and trimethylol propane trimethacrylate.

Still further, for example, inorganic particles include inorganic oxide such as silica, titanium oxide, alumina, and copper oxide, and composite oxide; and particles formed from glass, or ceramic.

The particle 12 for color showing layer constituting the color showing layer 15 may be an element comprising a single composition, or may be a compound. Further, the aforesaid particle may be a particle on which surface a substance, by which particles are allowed to adhere to each other, is adhered, or may be a particle within which a substance, by which particles are allowed to adhere to each other, is introduced. By employing such an adhesive, particles are allowed to adhere to each other, even if the particles are composed of materials which tend not to self-arrange during formation of the color showing layer. Further, in a case where the particles are formed employing materials exhibiting a high refractive index, a material exhibiting a low refractive index may be added internally.

To obtain particles exhibiting high monodispersity, in a case where particles for color showing layer are composed of organic materials, the aforesaid particles for color showing layer are preferably prepared via generally commonly used polymerization methods such as soap-free emulsion polymerization, suspension polymerization, and emulsion polymerization.

Further, the particles 12 for color showing layer may be subjected to various surface treatments to make the particles exhibit a high affinity to matrix M, control the refractive index of the particles 12 for color showing layer, or readily allow for regular arrangement of the particles.

Such color showing layer 15 can be formed via a method, for example, in which an aqueous dispersion of the particles 12 for color showing layer is prepared, and the dispersion is applied on a surface of the pattern image forming member 17 or a light transmissive substrate to allow particles to be self-arranged.

The coating methods such as a screen coating, a dip coating, a spin coating, a curtain coating, and a LB (Langmuir-Blodgett) film forming method can be employed.

[Matrix]

A material for matrix M which forms color showing layer 15 is not particularly limited, and can be suitably selected as long as the material exhibits a different refractive index from a material constituting the particles 12 for color showing layer, as well as the material can fix the aforesaid particles 12 for color showing layer.

The matrix M constituting the color showing layer is may be a substance in the form of gas or liquid, but a substance in the form of solid or gel is preferably employed since the prepared display medium exhibits a high strength, excellent particle-detachment restraining properties, and excellent flexibility.

The materials which form the matrix M constituting the color showing layer 15 can be suitably selected from materials whose refractive indices differ from that of the particle 12 for color showing layer, and are incompatible with materials composing the particle 12 for color showing layer.

Further, the materials which form the matrix M preferably have a high affinity to the particles.

Examples of the material which forms the matrix M include an organic solvent-soluble resin, a water-soluble resin, hydrogel, oilgel, a light curing agent, a heat curing agent, and a moisture curing agent.

Specific organic solvent-soluble resins include a polystyrene resin, an acryl resin, and a polyester resin, Water-soluble resins include a polyacrylic acid, a polyvinyl alcohol, and a polyvinyl chloride.

Specific hydrogels include a gel which is prepared by blending water and a gelling agent such as a gelatin, a carrageenan, a polyacrylic acid, and a sodium polyacrylate. Oil gels include a silicone gel, a fluorine silicone gel, and a gel which is prepared by blending a gelling agent such as aminoacid derivatives, cyclohexane derivatives, and polycyclohexane derivatives, with silicone oil or an organic solvent.

The refractive index of the matrix M can be determined by various commonly known methods, but the refractive index of the matrix M of the present invention is determined such that a thin film comprising only the matrix M is separately prepared and the thin film is measured using an Abbe Refractometer.

Specific refractive indices include, for example, 1.53 for gelatin/acacia gum, 1.51 for polyvinyl alcohol, 1.51 for sodium polyacrylate, 1.34 for fluorine modified acrylic resin, 1.51 for N-isopropyl amid, and 1.43 for foamed acrylic resin.

[Image Display Sheet]

The image display sheet 16 constituting the structural color display 10 of the present invention is a light transmissive substance and has the above-mentioned color showing layer 15.

By the term "light transmissive substance", it is meant that the substance can transmit visible light, and specifically, the substance is not an opaque substance which does not transmit visible light. The term "opaque substance" means a substance in which the display color of the structural color display does not change, even when the pattern image forming member is changed between a light absorptive state and a light reflective state with visible light being irradiated onto the structure display.

Meeting the needs of usage or production methods, a substrate or a surface coverage layer can be provided on the image display sheet 16 constituting the structural color display 10 of the present invention. An example of the constitution can be made by laminating a light transmissive substrate, the color showing layer 15 which is formed on the surface of the aforesaid light transmissive substrate, and a surface coverage layer which is provided on the aforesaid color showing layer 15 through a light transmissive adhesive layer, in this order.

The usable light transmissive substrate includes glass, and a film or a sheet of materials such as polyethylene terephthalate (PET) and polyethylene naphthalate (PEN).

In a case where the color showing layer 15 is produced by employing an aqueous dispersion of the particles 12 for color showing layer, the light transmissive substrate is preferably subjected to a suitable surface treatment, since the light transmissive substrate preferably exhibits a relatively low contact angle on the surface against water, and a high surface smoothness. Further, the light transmissive substrate may be subjected to a blast finishing treatment so that the particles for color showing layer readily adhere onto the surface of the above finishing treatment substrate.

In a case where the surface coverage layer is provided, usable materials for the aforesaid surface coverage layer include a film comprising materials such as polyethylene terephthalate (PET) and polyethylene naphthalate (PEN), and a film comprising a UV curable resin, all of which exhibit high transparency and do not prevent the structural color showing in the color showing layer 15.

[Pattern Image Forming Member]

The pattern image forming member 17 is constituted such that a plurality of the cells 18 are arranged side by side across the surface, and the plurality of the cells 18 can be independently switched if appropriate so that the each cell can irradiate white light L generated from a light source into the image display sheet 16 from the reverse side (the laminated layer surface 16S facing the aforesaid pattern image forming member 17) at an incident angle which is set for each of the aforesaid cell 18 based on the image patterns to be displayed. Such the pattern image forming member 17 includes, for example, the DMD (Digital Micromirror Device) element.

In the descriptions below, the DMD element is used to constitute the pattern image forming member 17.

The pattern image forming member 17 composed of the above DMD element is constituted of the cells 18, for example, from several hundred thousand to several millions, each of which works as a pixel, being arranged in a lattice pattern across the surface. Each aforesaid cell 18 is composed of movable micromirrors which are controlled to switch between a first inclined state and a second inclined state. The size of each cell 18 is, for example, several tens μm. The inclination angle β of the cell changes within the range of −12 to 12 degrees about a torsional axis by being turned ON/OFF corresponding to a driving signal to the DMD element.

Figure 4:
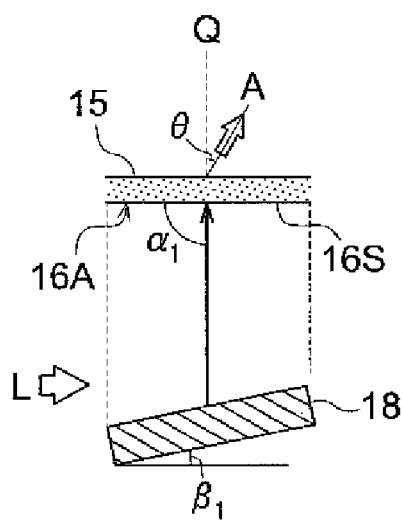
FIG. 4($a$), ($b$): An explanatory figure of a visually recognized color in the structural color of the present invention.
Figure 4:
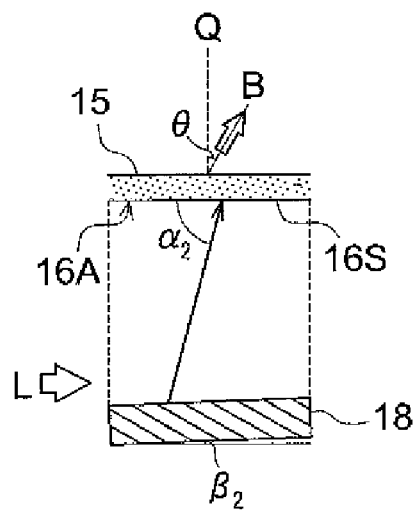

In FIGS. 4(a) and (b), there exists the relation of $\alpha = 2\beta$ between the incident angle $\alpha_1$, $\alpha_2$ to the image display sheet 16 and the inclination angle $\beta_1$, $\beta_2$ of the cell 18, provided that white light L from the light source is parallel to the image display sheet 16. Therefore for example, in the first inclined state (FIG. 4(a)) the incident angle $\alpha_1$ is 90 degrees when the inclination angle $\beta_1$ is 45 degrees, and in the second inclined state (FIG. 4(b)) the incident angle $\alpha_2$ becomes 76 degrees when the inclination angle $\beta_2$ is 38 degrees by changing 7 degrees of the inclination angle of the DMD element.

As each cell 18 is driven ON or OFF as described above, the incident angle of white light of each pixel into the image display sheet 16 can be controlled via a binary variable.

The structural color display 10 of the present invention may be formed by combining the light source, the pattern image forming member (the DMD element), and the image display sheet 16.

Specifically, the structural color display 10 is provided in such a manner that, on the element board 19 in which the pattern image forming member (the DMD element) 17 is arranged and fixed at an incline on the substrate 19 so that light is irradiated evenly onto each cell 18 of the pattern image forming member (the DMD element) 17, the image display sheet 16 is provided with the size of the maximum gap G being, for example, several mm to attain a laminated member, and a light source, irradiating white light L, is placed at the side of the laminated member so that the white light is irradiated from the side into the gap between the image display sheet and the element board 19.

In the above-described structural color display 10, corresponding to the image pattern to be displayed, the white light L from the light source is irradiated onto the area IA corresponding to each aforesaid cell 18, which is in the first inclined state, in the image display sheet 16, at an incident angle $\alpha_1$, and then the structural color A according to Bragg's Law is visually recognized from the surface of the image display sheet 16 with respect to the area 16A corresponding to that cell. While corresponding to the image pattern to be displayed, the white light L from the light source is irradiated onto the area 16A corresponding to each aforesaid cell 18, which is in the second inclined state, in the image display sheet 16, at an incident angle $\alpha_2$, and then the structural color B, which differs from the color A, according to Bragg's Law is visually recognized from the surface of the image display sheet 16 with respect to the area 16A corresponding to the cell. As a result, on the surface of the image display sheet 16, an image is visually recognized in two structural colors.

According to the above-described structural color display, since the structural color, which differs from colors generated by typical dye absorption, exhibits low energy loss, as well as exhibiting high brightness, the structural color display provides sufficient brightness at low electrical power consumption, and further, displays various colors with only one kind of an image display sheet by, for example, creating a pattern image forming member exhibiting a gradated display. Further, the structural color display exhibits high visual security of the displayed image, since the structural color depends on viewing angle.

In the foregoing embodiments, the present invention was specifically described, but is not limited to the above, and the embodiments can be variously modified.

EXAMPLES

The invention is described below with reference to examples, but the invention is not limited to them.

Example 1

For Preparation of Particle for Color Showing Layer 100 parts by mass of styrene was heated to 80° C. to prepare a mixed solution of a monomer. The surfactant solution [A], in which 0.4 parts by mass of sodium dodecyl sulfonate was dissolved into 263 parts by mass of distilled water, was heated to 80° C., which surfactant solution was then blended with the above mixed solution of a monomer. After that, the resulting mixture was subjected to a dispersion treatment for 30 minutes via a mechanical dispersion apparatus "CLEARMIX" (produced by M Technique Co., Ltd.) to prepare an emulsified dispersion.

Into a reaction vessel equipped with a mixer, a heating and cooling apparatus, a nitrogen charging apparatus, and a material and additive introducing apparatus, the surfactant solution [B], in which the above emulsified dispersion and 0.2 parts by mass of sodium dodecyl sulfonate were dissolved into 142 parts by mass of distilled water, was introduced, and the temperature of the solution was raised to 80° C. while stirring at a stirring rate of 200 rpm in a nitrogen gas stream atmosphere. Into the above solution, 1.4 parts by mass of potassium persulfate, and 54 parts by mass of water were introduced, and the resulting solution was subjected to polymerization treatment for 3 hours. After that, the materials produced by the above polymerization reaction were filtered off, sufficiently washed with distilled water, and then dried employing a vacuum dryer, to prepare the particle [1] for color showing layer comprising a highly monodispersed polystyrene exhibiting an average particle diameter of 200 nm, and a CV value of 5%. The determinations of the average particle diameter and the CV value were carried out in the methods similar to the above. In the examples below, the determinations were similarly carried out.

Examples 2 and 3

For Preparation of Particle for Color Showing Layer

The particles [2] and [3] for color showing layer comprising a highly monodispersed polystyrene were prepared in a similar manner to Example 1 for the preparation of particle for color showing layer except that the amount of the sodium dodecyl sulfonate for the preparation of the surfactant solution [A] of Example 1 was changed to 0.37 parts by mass and 0.34 parts by mass for the particles [2] and [3] respectively. The average particle diameter and the CV value for each of the particles [2] and [3] are given in Table 1.

Example 1

For Preparation of Image Display Sheet

A suspension solution incorporating the particle [1] for color showing layer in an amount of 20% by mass was prepared, which was then applied onto a transparent PET film of 50 μm in thickness to 30 μm in thickness containing water, and then dried to prepare the display sheet comprising the coated film of 4 μm in thickness. On the surface of the above coated film, polyethylene terephthalate (PET) was applied as a protective layer, and the display layer was subjected to a fixing treatment by re-drying, to prepare the image display sheet [1].

Figure 5:
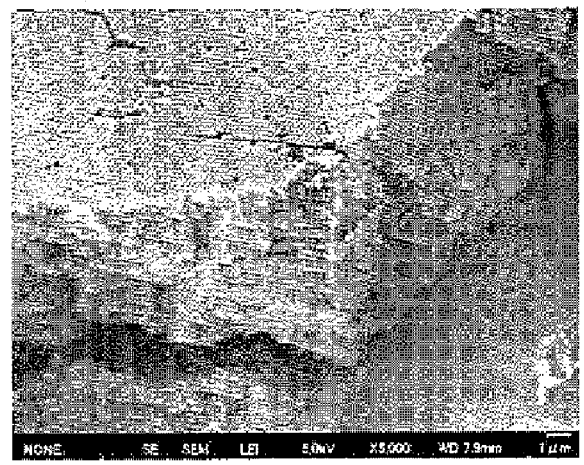
FIG. 5: A SEM photograph of the image display sheet prepared as an example.
Figure 6:
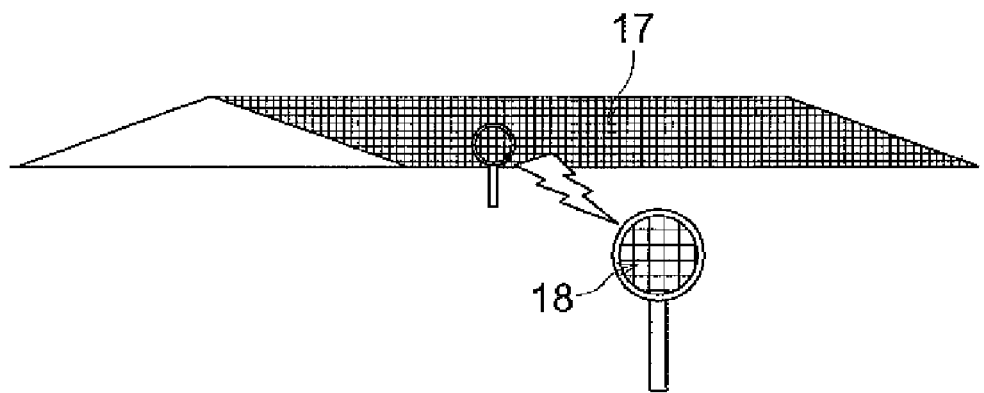
FIG. 6: An explanatory figure of the cell constituting the structural color display of the present invention.

The above image display sheet [1] was subjected to a SEM observation, and as a result it was confirmed that the particles were regularly arranged in a hexagonal close-packed structure. The SEM photograph taken by the above SEM observation is shown in FIG. 5.

Examples 2 to 3

For Preparation of Image Display Sheet

The image display sheets [2] to [3] were prepared in a similar manner to the preparation of the image display sheet [1] except that the particle [1] for color showing layer was change to each of the particles [2] to [3] for color showing layer.

Example 1 to 3

For Manufacturing of Structural Color Display

The structural color display as shown in FIG. 1 was manufactured in such a manner that, on the element board in which the DMD element was arranged and fixed at an incline to the substrate so that light is irradiated evenly onto each cell of the above DMD element, the image display sheets [1] to [3] was provided with the size of the minimum gap being 50 μm to attain a laminated member, and a light source, irradiating white light, was placed at the side of the above laminated member so that the white light was irradiated from the side into the gap between the image display sheets [1] to [3] and the DMD element. The thus prepared structural color displays are designated as the displays [1] to [3].

In the above manufacturing, the following DMD element was employed: an inclination angle of each cell is allowed to vary in a range of 24 degrees (from −12 to 12 degrees) and when each cell is set to OFF, an incident angle of light, which is irradiated onto the area of the image display sheet corresponding to each aforesaid cell, becomes 90 degrees, and when each cell is set to ON, an incident angle of light, which is irradiated onto the area of the image display sheet corresponding to each aforesaid cell, becomes 76 degrees.

Comparative Example 1

For Manufacturing of Structural Color Display

The display [4] for a comparative example was manufactured in a similar manner to Example 1 for manufacturing of a structural color display except that a color filter of "HIGH-COLOR-PURITY COLOR FILTER" (made by Dai Nippon Printing Co., Ltd.) was employed in place of the image display sheet [1].

Examples 1 to 3

With regard to the displays [1] to [3] of the present invention and the display [4] for the comparative example, the display color was visually observed from a front direction perpendicularly to the display (that is, an viewing angle θ with respect to a perpendicular axis of the image display sheet was zero) when each cell of the DMD element was turned ON or OFF, and at the same time, it was evaluated whether the display color, which was visually observed obliquely at an angle of 45 degrees (that is, an viewing angle θ with respect to a perpendicular axis of the image display sheet was 45 degrees), changed from the color which was visually observed from a front direction.

TABLE 1

| | Display No. | Particles for color developing layer | | Color observed frontally | | Change of color observed obliquely |
|---|---|---|---|---|---|---|
| | | Average particle size (nm) | CV value (%) | DMD cell: OFF | DMD cell: ON | |
| Example 1 | 1 | 175 | 5 | Orange | Yellow | Changed |
| Example 2 | 2 | 200 | 5 | Reddish purple | Red | Changed |
| Example 3 | 3 | 225 | 5 | Bluish green | Purple | Changed |
| Comparative example 1 | 4 | — | — | Red | Red | Not changed |

As is clearly shown in the Table 1, it was confirmed on the displays [1] to [3] of the embodiments of the present invention that the visually recognized structural color can be changed by changing the incident angle of the white light, and also the visually observed colors when viewed perpendicularly to the display were distinctly different from the visually observed colors when viewed obliquely at 45 degrees with respect to the perpendicular axis of the image display and the effect to enhance security is confirmed Further, it was found that a structural color exhibiting any peak wavelength could be showed by changing an average particle size of particles for the color showing layer which formed the color showing layer.

What is claimed is:

1. A structural color display for displaying an image with a structural color, comprising:
    (a) a pattern forming member which forms a plurality of cells each lined up in two dimension; and
    (b) a light transmissive image display sheet comprising a color showing layer and the light transmissive image display sheet being faced to the pattern forming member (a),
    wherein each cell of the pattern forming member is independently controlled to reflect a light from a light source corresponding to an image pattern to be displayed,
    provided that the reflected light is made to enter in the colors showing layer of the image display sheet from a side facing the pattern forming member by a predetermined incident angle corresponding to the cell, and
    wherein the light reflected into the color showing layer shows the structural color for displaying the image according to the incident angle to the image display sheet.

2. The structural color display of claim 1,
    wherein the each of the plurality of cells has a microscopic mirror which is individually rotated.

3. The structural color display of claim 1,
    wherein the color showing layer of the image display sheet comprises a plurality of particles for color showing and a matrix between the particles; and a difference in refractive index between the particles and the matrix is from 0.1 to 0.7.

4. The structural color display of claim 3,
    wherein a difference in refractive index between the particles and the matrix is from 0.2 to 0.5.

5. The structural color display of claim 3,
    wherein an average particle diameter of the particles is from 100 to 300 nm.

6. The structural color display of claim 5,
    wherein an average particle diameter of the particles is from 150 to 250 nm.

7. The structural color display of claim 3,
    wherein the particle have a CV value defined by the following Formula (CV) in the range of 20% or less:

CV value (%) = ((a standard deviation)/(an average particle diameter))×100    Formula (CV).

8. The structural color display of claim 7,
    wherein the particle have a CV value in the range of 10% or less.

9. The structural color display of claim 7,
    wherein the particle have a CV value in the range of 5% or less.

10. The structural color display of claim 1,
    wherein the color showing layer has a thickness of 3 to 30 µm.

11. The structural color display of claim 1, comprising a plurality of color showing layers having a repeating number of 8 or more.

12. The structural color display of claim 1, comprising a plurality of color showing layers having a repeating number of 8 to 50.

13. The structural color display of claim 1,
    wherein the particles in the color showing layer are close-packed so as to form a cubic close-packed structure or a hexagonal close-packed structure.

* * * * *